(12) United States Patent
Hyun (10) Patent No.: US 8,474,579 B2
(45) Date of Patent: Jul. 2, 2013

(54) ELECTROMOTIVE BRAKE SYSTEM

(75) Inventor: Dongyoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 13/182,639

(22) Filed: Jul. 14, 2011

(65) Prior Publication Data

US 2012/0145491 A1  Jun. 14, 2012

(30) Foreign Application Priority Data

Dec. 9, 2010  (KR) .................. 10-2010-0125694

(51) Int. Cl.
*F16D 55/02* (2006.01)
(52) U.S. Cl.
USPC ........ 188/71.9; 188/71.8; 188/72.7; 188/156; 188/162; 188/196 D; 192/54.52; 192/84.6; 192/94
(58) Field of Classification Search
USPC ............. 188/71.8, 71.9, 72.7, 72.8, 156, 162, 188/196 BA, 196 D, 196 R, 196 V; 192/54.52, 192/69.81, 84.6, 94
See application file for complete search history.

(56) References Cited

U.S. PATENT DOCUMENTS

| | | | | |
|---|---|---|---|---|
| 3,638,763 A * | 2/1972 | Laverdant | ..................... | 188/72.6 |
| 3,900,084 A * | 8/1975 | Farr | ........................... | 188/196 F |
| 5,038,895 A * | 8/1991 | Evans | .......................... | 188/72.7 |
| 5,609,227 A * | 3/1997 | Mery | ............................. | 188/72.7 |
| 5,788,024 A * | 8/1998 | Meyer | .......................... | 188/72.7 |
| 5,868,225 A * | 2/1999 | Hulliger | ....................... | 188/72.4 |
| 6,651,784 B1 * | 11/2003 | Barbosa et al. | ............. | 188/71.9 |
| 6,659,236 B1 * | 12/2003 | Clark et al. | ................ | 188/79.52 |
| 6,749,044 B2 * | 6/2004 | Boisseau | ...................... | 188/72.7 |
| 6,959,791 B2 * | 11/2005 | Usui | ............................. | 188/72.1 |
| 6,971,484 B2 * | 12/2005 | Sekiguchi | ..................... | 188/72.7 |
| 7,331,432 B2 * | 2/2008 | Watada | ......................... | 188/72.7 |
| 8,302,741 B2 * | 11/2012 | Chen et al. | .................... | 188/72.8 |

FOREIGN PATENT DOCUMENTS

| | | |
|---|---|---|
| JP | 2000-110867 A | 4/2000 |
| JP | 2009-209989 A | 9/2009 |
| KR | 10-2006-0033355 A | 4/2006 |
| KR | 10-2009-0040073 A | 4/2009 |

* cited by examiner

*Primary Examiner* — Robert A Siconolfi
*Assistant Examiner* — Mariano Sy
(74) *Attorney, Agent, or Firm* — Morgan, Lewis & Bockius LLP (57) ABSTRACT

An electromotive brake system may include a caliper housing, a first and second friction pads, a brake disk disposed in between, a pressurizing member connected to the second friction pad, a push rod with a push rod groove, an operating disk inserted in the push rod groove, first and second springs, a rotating ramp adapted to convert the rotational movement of a motor into a linear movement of a non-rotating ramp by a ball disposed between the rotating ramp and the non-rotating ramp. The electromotive brake system may further include first and second catching portions, a plurality of teeth and corresponding engaging protrusion of the teeth. The plurality of teeth and the protrusion may have slanted or curved surfaces.

14 Claims, 6 Drawing Sheets

ELECTROMOTIVE BRAKE SYSTEM

CROSS-REFERENCE TO RELATED APPLICATION

The present application claims priority of Korean Patent Application Number 10-2010-0125694 filed in the Korean Intellectual Property Office on Dec. 9, 2010, the entire contents of which application is incorporated herein for all purposes by this reference.

BACKGROUND OF THE INVENTION

1. Field of Invention

The present invention relates to an electromotive brake system. More particularly, the present invention relates to an electromotive brake system having high reliability of operation by automatically correcting the abrasion of friction pads.

2. Description of Related Art

Generally, an electromotive brake system, different from a typical hydraulic pressure brake, applies pressure to a friction pad by using mechanical mechanism driven by an electric motor and generates braking force.

A conventional electromotive brake system includes a motor rotating to one direction for braking and to the other direction for releasing braking, a screw gear portion connected to a rotation shaft of the motor, and a pressurizing member converting a rotational movement of the screw gear portion into a linear movement and applying pressure to a friction pad.

Since the screw gear portion glidingly contacts to the pressurizing member according to the conventional electromotive brake system, friction loss is great. A ball screw or a roller screw with small friction is used in order to reduce the friction loss. If the ball screw or the roller screw is used, the weight and cost of the system may increase.

In addition, since a lead angle of the screw is constant, applying force of the friction pad to an input torque of the motor is also constant. Therefore, the capacity of the motor should be increased so as to generate large braking force.

Furthermore, the moving distance of the pressurizing member is proportional to the rotation of the motor in the electromotive brake system. Since the maximum rotation speed of the motor is fixed, it takes a certain amount of time for releasing the brake.

Meanwhile, if the abrasion of the friction pad is not corrected when the friction pad of the electromotive brake system is worn out, the brake may not function appropriately even if the motor rotates by a predetermined angle.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide an electromotive brake system having advantages of automatically correcting the abrasion of friction pads and reducing the releasing time of brakes.

Various aspects of the present invention are directed to an electromotive brake system that may include a caliper housing, a first friction pad fixed to the caliper housing, a second friction pad adapted to move toward the first friction pad, and a brake disk disposed between the first friction pad and the second friction pad, and may convert rotational movement of a motor into a linear movement of the second friction pad.

Other aspects of the present invention are directed to an electromotive brake system that may further include: a pressurizing member or a connection member operably connected to the second friction pad and formed with screw threads in its interior circumference of the rear end portion thereof; a push rod having the front end portion threaded according to the interior circumference of the pressurizing member and formed with a push rod groove being concave toward the front end at the inner circumference of the rear end portion of the push rod; an operating disk inserted in the push rod groove and adapted to selectively rotate the push rod so as to selectively move the pressurizing member forward with respect to the push rod; a non-rotating ramp adapted to exert force on the push rod so as to move the push rod forward; a first spring adapted to apply force against the force of the non-rotating ramp to the push rod; and a rotating ramp adapted to convert the rotational movement of the motor into a linear movement of the non-rotating ramp by means of a ball disposed between the rotating ramp and the non-rotating ramp, the rotating ramp penetrating and protruding forward into the non-rotating ramp.

According to some aspects of the present invention, the operating disk may be provided with a first catching portion and the rotating ramp may be provided with a second catching portion. The second catching portions can be electively caught by the first catching portion such that the rotating ramp rotates the operating disk when the motor rotates to one direction and the rotating ramp does not rotate the operating disk when the motor rotates to the other direction.

A plurality of teeth may be formed at the push rod groove and a protrusion caught by the plurality of teeth may be formed at the front surface of the operating disk. Or vice versa, a plurality of teeth may be formed at the front surface of the operating disk and a protrusion caught by the plurality teeth may be formed at the push rod groove.

Moreover, an insert groove may be formed at the front end of the rotating ramp and the rear end portion of the operating disk may be inserted in the insert groove. A second spring applying elastic force that pushes the protrusion toward the teeth may be interposed between the operating disk and the rotating ramp.

A first slanted surface may be formed at the plurality of teeth and a second slanted surface corresponding to the first slanted surface may be formed at the protrusion such that the protrusion climbs the teeth when the motor rotates to one direction and the protrusion does not climb the teeth when the motor rotates to the other direction.

The operating disk may rotate to the other direction and may rotate the push rod by the elastic force of the second spring in a case that the motor rotates to the other direction after the protrusion climbs the teeth.

According to other aspects of the present invention, the push rod groove may be provided with a first catching portion and the operating disk may be provided with a second catching portion selectively caught by the first catching portion such that the operating disk does not rotate the push rod when the operating disk rotates to one direction and the operating disk rotates the push rod when the operating disk rotates to the other direction.

A plurality of teeth may be formed at the rear surface of the operating disk and a protrusion caught by the plurality of teeth may be formed at the front surface of the rotating ramp. Or vice versa, a plurality of teeth may be formed at the front surface of the rotating ramp and a protrusion caught by the plurality of teeth may be formed at the rear surface of the operating disk.

Moreover, an insert groove may be formed at the front end of the push rod groove and the front end portion of the operating disk may be inserted in the insert groove. A second spring applying elastic force that pushes the teeth toward the protrusion may be interposed between the push rod groove and the operating disk.

A first slanted surface may be formed at the plurality of teeth and a second slanted surface corresponding to the first slanted surface may be formed at the protrusion such that the protrusion climbs the teeth when the motor rotates to the one direction and the protrusion does not climb the teeth when the motor rotates to the other direction.

Furthermore, the first and second catching portions may be caught and the operating disk may rotate the push rod in a case that the motor rotates to the other direction after the protrusion climbs the teeth.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
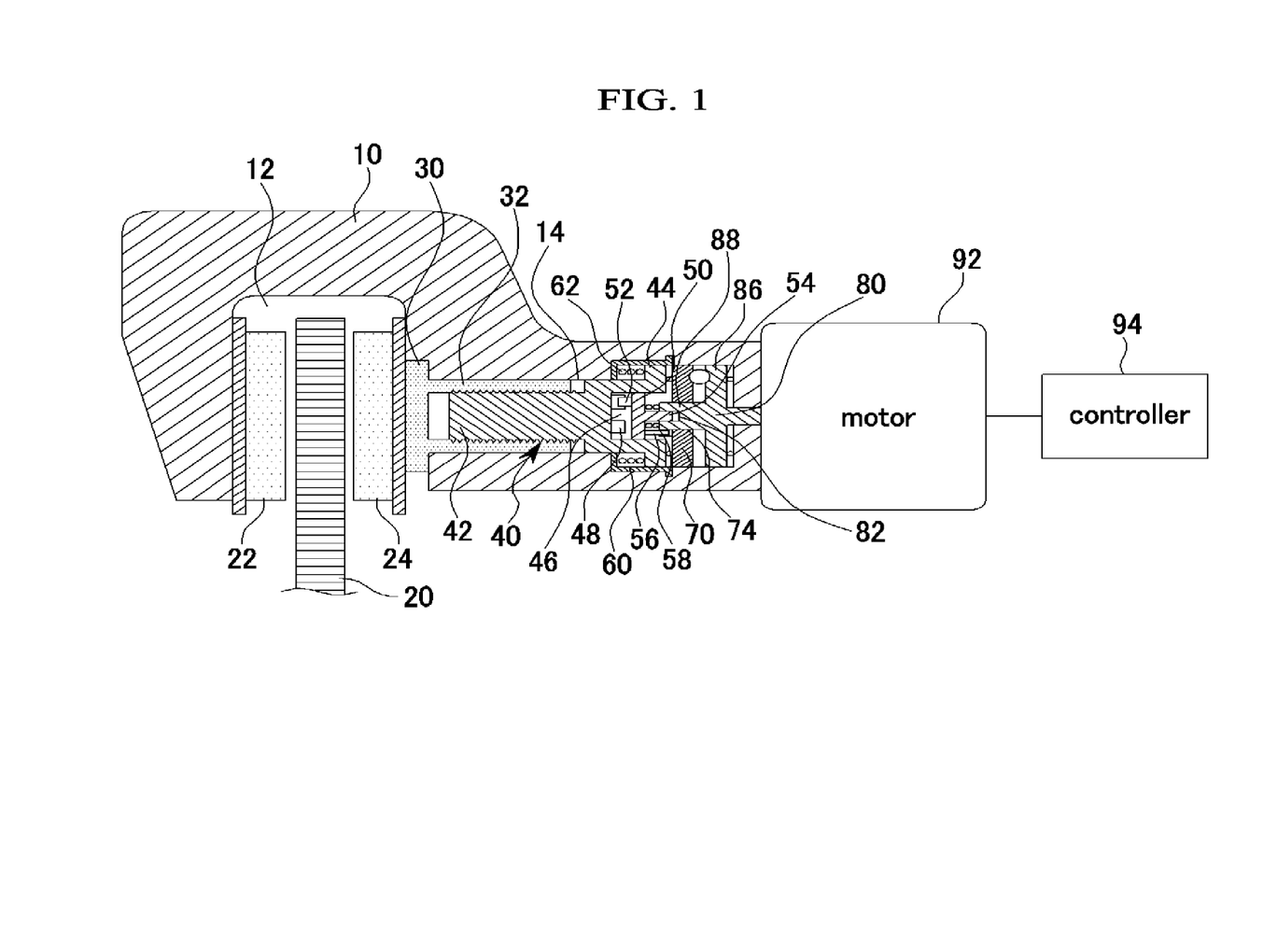
FIG. 1 is a cross-sectional view of an exemplary electromotive brake system according to the present invention.

As shown in FIG. 1, various features of an exemplary electromotive brake system according to the present invention may include a caliper housing 10, a brake disk 20, first and second friction pads 22 and 24, a pressurizing member 30, a push rod 40, an operating disk 50, a non-rotating ramp 70, a rotating ramp 80, a motor 92, and a controller 94.

The caliper housing 10 is mounted at a vehicle body, a housing groove 12 is formed at the front end portion of the caliper housing 10, and a motor 92 is disposed at the rear end of the caliper housing 10. A mounting recess 14 is extended rearward from the rear surface of the housing groove 12. The pressurizing member 30, the push rod 40, the operating disk 50, the non-rotating ramp 70, and the rotating ramp 80 are mounted in the mounting recess 14.

A first friction pad 22 is fixedly attached to the front surface of the housing groove 12, and a second friction pad 24 is contacted to the pressurizing member 30 such that the second friction pad 24 is adapted to move forward or rearward if the pressurizing member 30 moves forward or rearward. The brake disk 20 is disposed between the first and second friction pads 22 and 24. The brake disk 20 is coupled to a rotating element of a wheel bearing. If the second friction pad 24 moves forward, the brake disk 20 is stopped by the first and second friction pads 22 and 24 and the rotating element of the wheel bearing coupled to the brake disk 20 is also stopped. If the second friction pad 24 moves rearward, the brake disk 20 as well as the rotating element of the wheel bearing rotates freely.

The pressurizing member 30 is inserted in the mounting recess 14, and the front surface of the pressurizing member 30 is contacted to or operably connected to the second friction pad 24. In addition, the rear end portion 32 of the pressurizing member has a cylindrical shape, and a screw thread is formed at the interior circumference of the rear end portion 32 of the pressurizing member.

The push rod 40 selectively rotates so as to move the pressurizing member 30 forward or rearward. To move the pressurizing member 30 forward, the front end portion 42 of the push rod is inserted in and is threaded to the rear end portion 32 of the pressurizing member. In addition, the rear end portion 44 of the push rod is contacted to the non-rotating ramp 70 directly or indirectly so as to receive force from the non-rotating ramp 70 forward. It is exemplarily shown in this specification that a bearing is interposed between the rear end portion 44 of the push rod and the non-rotating ramp 70, but the scope of the present invention is not limited to this. On the other hand, the rear end portion 44 of the push rod is inserted in a spring cage 60 mounted at the mounting recess 14, and a first spring 62 is mounted between the spring cage 60 and the rear end portion 44 of the push rod. The first spring 62 exerts elastic force on the push rod 40 so as to move the push rod 40 rearward.

A push rod groove 46 being concave forward is formed at the inner circumference of the rear end portion 44 of the push rod, and a plurality of teeth 48 is formed circumferentially at the push rod groove 46.

The operating disk 50 is inserted in the push rod groove 46. A protrusion 52 caught by the plurality of teeth 48 is formed at a front surface of the operating disk 50, and a rear end portion 54 of the operating disk extends rearward lengthily. In addition, a first catching portion 56 extending rearward is formed at an external circumferential portion of a rear surface of the operating disk 50.

Figure 2:
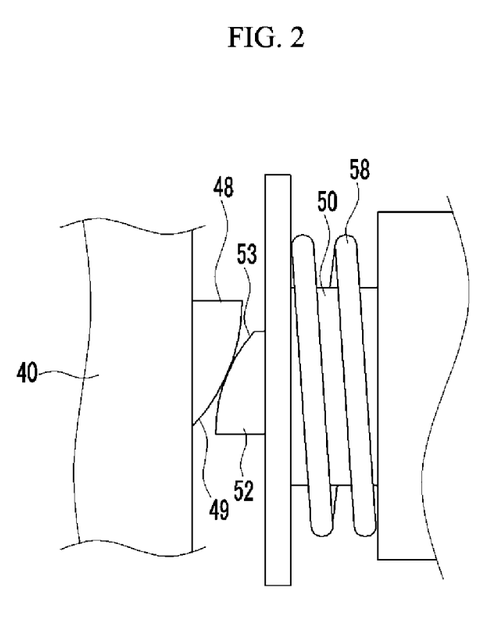
FIG. 2 is a schematic diagram of a coupling structure of an exemplary push rod and an exemplary operating disk according to the present invention.

As shown in FIG. 2, a first slanted surface 49 is formed at the plurality of teeth 48 and a second slanted surface 53 corresponding to the first slanted surface 49 is formed at the protrusion 52. Therefore, if the operating disk 50 rotates to one direction (hereinafter, it is called 'positive direction'), the protrusion 52 can climb the teeth 48. On the contrary, if the operating disk 50 rotates to the opposite direction (hereinafter, it is called 'negative direction'), the protrusion 52 is caught by the teeth 48 and the operating disk 50 rotates the push rod 40. The first and second slanted surfaces 49 and 53 may be curved surfaces.

Meanwhile, it is exemplified in the first exemplary embodiment that the plurality of teeth 48 is formed at the push rod 40 and the protrusion 52 is formed at the operating disk 50, but the present invention is not limited to this. That is, the protrusion may be formed at the push rod 40 and the plurality of teeth may be formed at the operating disk 50.

Figure 3:
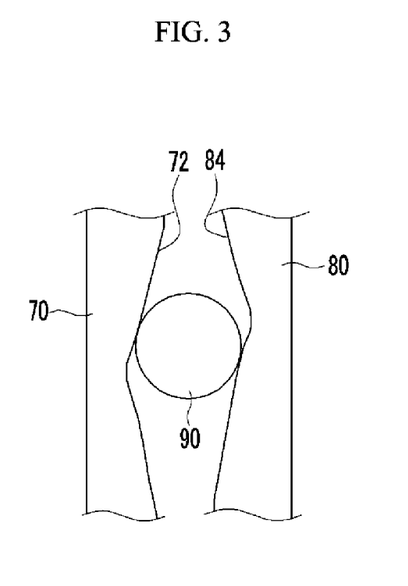
FIG. 3 is a schematic diagram of a coupling structure of an exemplary rotating ramp and an exemplary non-rotating ramp according to the present invention.

As shown in FIG. 3, the non-rotating ramp 70 together with the rotating ramp 80 and a ball 90 converts a rotational movement of the motor 92 into a linear movement and transmits the linear movement to the push rod 40. A penetration hole 74 is formed at an interior circumference of the non-rotating ramp 70.

Referring to FIG. 1, the rotating ramp 80 is connected to the motor 92 so as to rotate together with the motor 92. Typically, speed reduction means are mounted between the motor 92 and the rotating ramp 80.

Figure 4:
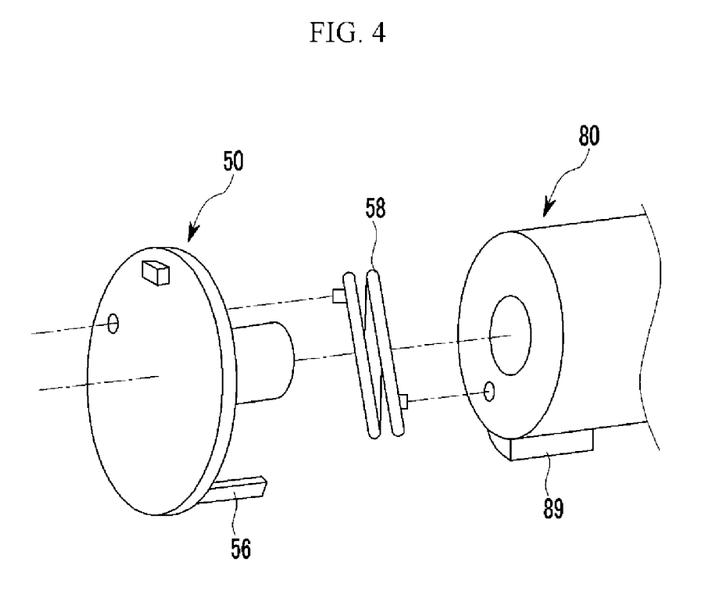
FIG. 4 is an exploded diagram of a coupling structure of an exemplary operating disk and an exemplary rotating ramp according to the present invention.

Referring to FIGS. 1-4, the front end portion 88 of the rotating ramp penetrates the penetration hole 74 and is coupled to the operating disk 50. An insert groove 82 is formed at the interior circumference of the front end portion 88 of the rotating ramp, and the rear end portion 54 of the operating disk is movably inserted in the insert groove 82. In addition, as shown in FIG. 4, a second catching portion 89 corresponding to the first catching portion 56 of the operating disk 50 is formed at the exterior circumference of the front end portion 88 of the rotating ramp. The first and second catching portions 56 and 89 are adapted to be caught by each other if the rotating ramp 80 rotates to the positive direction, and thereby the operating disk 50 rotates together with the rotating ramp 80. Moreover, the first and second catching portions 56 and 89 are adapted to come off if the rotating ramp 80 rotates to the negative direction, and thereby the operating disk 50 does not rotate and only the rotating ramp 80 rotates. Furthermore, a second spring 58 is mounted between the rear surface of the operating disk 50 and the front end portion 88 of the rotating ramp. The second spring 58 supplies elastic force for pushing the operating disk 50 forward and for rotating the operating disk 50 to relatively negative direction to the rotating ramp 80 if the rotating ramp 80 rotates to negative direction.

Meanwhile, the depth by which the rear end portion 54 of the operating disk is inserted in the insert groove 82 can be changed. That is, when the protrusion 52 climbs the teeth 48, the rear end portion 54 of the operating disk is inserted deeper in the insert groove 82.

The front surface of the middle portion 86 of the rotating ramp faces the rear surface of the non-rotating ramp 70. As shown in FIG. 3, a third slanted surface 72 is formed at the rear surface of the non-rotating ramp 70, a fourth slanted surface 84 is formed at the middle portion 86 of the rotating ramp, and the ball 90 is disposed between the third slanted surface 72 and the fourth slanted surface 84. In addition, a distance between the third slanted surface 72 and the fourth slanted surface 84 is changed along the radial direction. Therefore, if the rotating ramp 80 rotates, the ball 90 moves radially along the third and fourth slanted surfaces 72 and 84. Accordingly, the non-rotating ramp 70 moves forward or rearward with respect to the rotating ramp 80 such that the non-rotating ramp 70 pushes the push rod 40 forward or the push rod 40 is pushed rearward by the elastic force of the first spring 62.

As described above, since the rotational movement of the rotating ramp 80 is converted into a linear movement of the non-rotating ramp 70 by a movement of the ball 90, the ball 90 is returned to an original position thereof quickly if the motor 92 begins to rotate to the negative direction. Therefore, braking can be released quickly.

The motor 92 is connected to the rotating ramp 80 and rotates the rotating ramp 80 to the positive direction or the negative direction. The controller 94 is electrically connected to the motor 92 so as to rotate the motor 92 to the positive direction in the case of braking and to rotate the motor 92 to the negative direction in the case of releasing braking.

Hereinafter, the operation processes of the electromotive brake system according to one of various exemplary embodiments of the present invention will be described in detail. The corresponding drawings are shown in FIGS. 1-4.

When the motor 92 rotates to the positive direction by the control of the controller 94, the ball 90 disposed between the third and fourth slanted surfaces 72 and 84 moves radially and pushes the non-rotating ramp 70 forward. The non-rotating ramp 70 pushes the push rod 40 and the pressurizing member 30 threaded to the push rod such that the brake disk 20 and the first and second friction pads 22 and 24 are contacted with each other. Therefore, the brake disk 20 is stopped.

When the motor 92 rotates to the negative direction by the control of the controller 94, the ball 90 disposed between the third and fourth slanted surfaces 72 and 84 is returned to the original position thereof and the push rod 40 and the pressurizing member 30 are pushed rearward by the elastic force of the first spring 62. Therefore, friction between the brake disk 20 and the first and second friction pads 22 and 24 vanishes.

If the rotating ramp 80 rotates to the positive direction, the operating disk 50 also rotates to the positive direction by the first and second catching portions 56 and 89. In this case, the second slanted surface 53 of the operating disk 50 moves along the first slanted surface 49 of the push rod 40, and the operating disk 50 is inserted deeper in the insert groove 82. In a state that the first and second friction pads 22 and 24 are not worn out, a distance by which the pressurizing member 30 moves forward is not large and the protrusion 52 cannot climb the teeth 48.

If the rotating ramp 80 rotates to the negative direction at this state, the first and second catching portions 56 and 89 cannot restrict movements thereof and the operating disk 50 stays a stopped state. After that, if relative rotation between the rotating ramp 80 and the operating disk 50 becomes large, the operating disk 50 also rotates to the negative direction by the elastic force of the second spring 58.

If the first and second friction pads 22 and 24 are worn out, the distance by which the pressurizing member 30 moves forward becomes larger. In this case, the protrusion 52 climbs the teeth 48.

If the rotating ramp 80 rotates to the negative direction at this state, the first and second catching portions 56 and 89 cannot restrict the movements thereof and the operating disk 50 stays the stopped state. After that, if the relative rotation between the rotating ramp 80 and the operating disk 50 becomes large, the operating disk 50 also rotates to the negative direction by the elastic force of the second spring 58. At this time, since the protrusion 52 cannot climb the teeth 48, the operating disk 50 rotates the push rod 40 and the pressurizing member 30 threaded to the push rod 40 moves forward by a predetermined distance. Therefore, abrasion of the first and second friction pads 22 and 24 is corrected automatically.

Figure 5:
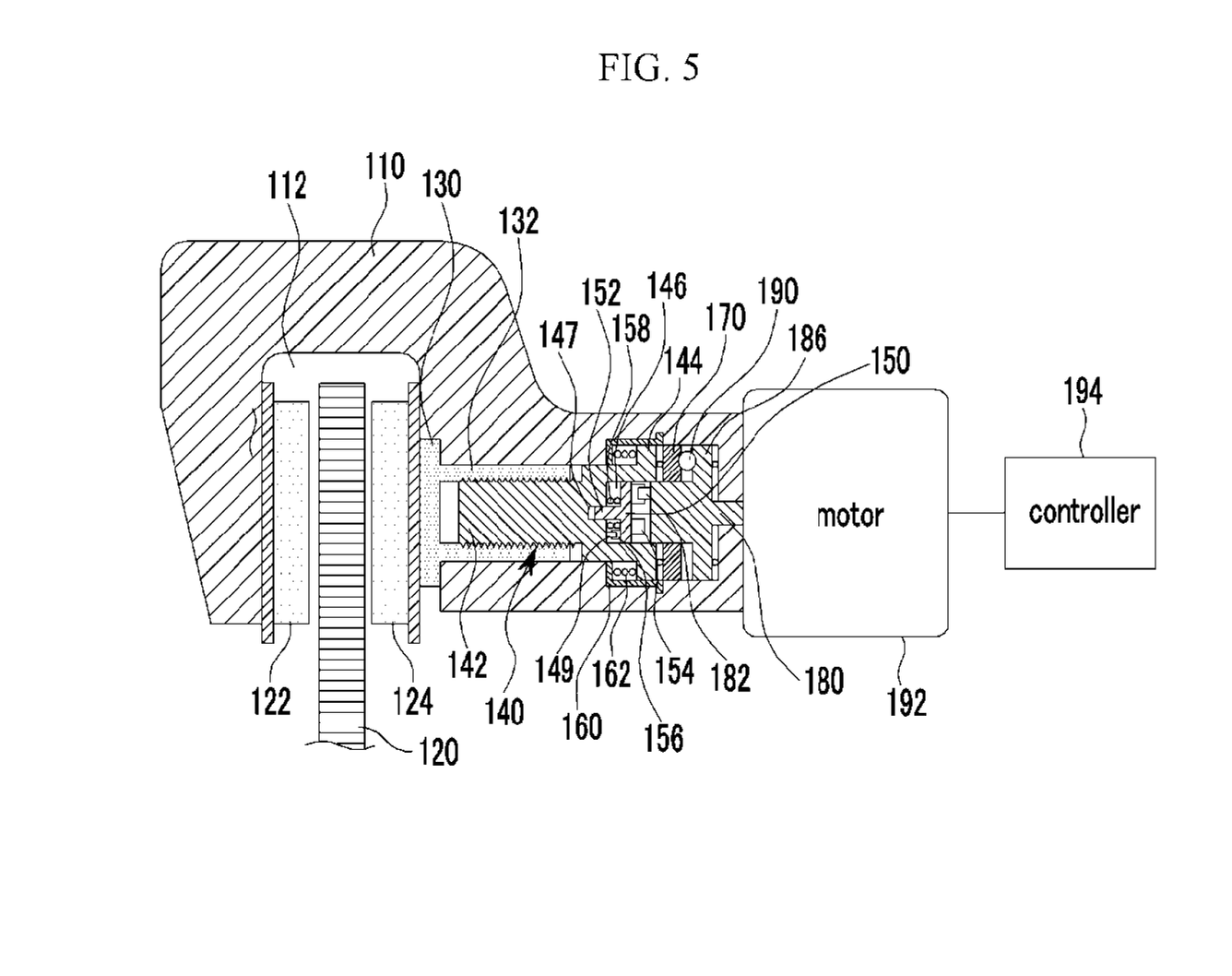
FIG. 5 is a cross-sectional view of another exemplary electromotive brake system according to the present invention.
Figure 6:
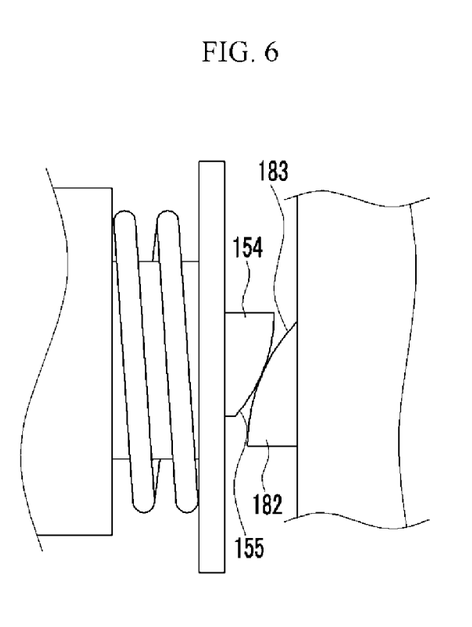
FIG. 6 is a schematic diagram of a coupling structure of another exemplary operating disk and another exemplary rotating ramp according to the present invention is shown.

Another exemplary embodiment of the electromotive brake system according to the present invention is shown in FIGS. 5-6. Some features of this exemplary embodiment are similar to those described above, but some are not. Only features different from those mentioned above will be described.

As shown in FIG. 5, the insert groove 147 is formed forward at the front surface of the push rod groove 146, and the front end portion 152 of the operating disk extends forward so as to be inserted in the insert groove 147. In addition, the second spring 158 is mounted between the push rod groove 146 and the front surface of the operating disk 150.

The first catching portion 149 is formed at the push rod groove 146 and the second catching portion 156 corresponding to the first catching portion 149 is formed at the front surface of the operating disk 150. As such, the first and second catching portions 149 and 156 do not restrict the movements thereof if the operating disk 150 rotates to the positive direction and the first and second catching portions 149 and 156 are caught by each other and the operating disk 150 rotates the push rod 140 to the negative direction if the operating disk 150 rotates to the negative direction.

The plurality of teeth 154 is formed at the rear surface of the operating disk 150, and the protrusion 182 caught by the plurality of teeth 154 is formed at the front surface of the rotating ramp 180. As shown in FIG. 6, the first slanted surface 155 is formed at the plurality of teeth 154 and the second slanted surface 183 corresponding to the first slanted surface 155 is formed at the protrusion 182. Therefore, if the operating disk 150 rotates to the positive direction the protrusion 182 can climb the teeth 154, but if the operating disk 150 rotates to the negative direction the protrusion 182 is caught by the teeth 154 and the operating disk 150 rotates the push rod 140. The first and second slanted surfaces 155 and 183 may be curved surfaces.

Meanwhile, it is exemplified in the second exemplary embodiment that the plurality of teeth 154 is formed at the operating disk 150 and the protrusion 182 is formed at the rotating ramp 180, but the present invention is not limited to this. That is, the protrusion may be formed at the operating disk 150 and the plurality of teeth may be formed at the rotating ramp 180.

Hereinafter, the operation processes of the electromotive brake system according to another exemplary embodiment of the present invention will be described in detail. The corresponding drawings are shown in FIGS. 5-6.

When the rotating ramp 180 rotates to the positive direction, the second slanted surface 183 of the rotating ramp 180 moves along the first slanted surface 155 of the operating disk 150 and the operating disk 150 is inserted deeper in the insert groove 147. In a state that the first and second friction pads 122 and 124 are not worn out, the distance by which the pressurizing member 130 moves forward is not large and the protrusion 182 cannot climb the teeth 154.

If the rotating ramp 180 rotates to the negative direction at this state, the first and second catching portions 149 and 156 cannot restrict the movements thereof and the operating disk 150 stays the stopped state.

If the first and second friction pads 122 and 124 are worn out, the distance by which pressurizing member 130 moves forward becomes larger. In this case, the protrusion 182 climbs the teeth 154.

If the rotating ramp 180 rotates to the negative direction at this state, the protrusion 182 cannot climb the teeth 154 and the operating disk 150 rotates to the negative direction. At this time, the operating disk 150 rotates the push rod 140 by the first and second catching portions 149 and 156 and the pressurizing member 130 threaded to the push rod 140 moves forward by the predetermined distance. Therefore, abrasion of the first and second friction pads 122 and 124 is corrected automatically.

As described above, if the friction pad is worn out, the operating disk rotates the push rod and moves the pressurizing member forward relative to the push rod according to various exemplary embodiments of the present invention. Therefore, the abrasion of the friction pad is corrected automatically.

Since the ball is disposed between the rotating ramp and the non-rotating ramp and the ball moves so as to push the non-rotating ramp forward if the rotating ramp rotates, braking is released quickly.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromotive brake system comprising:
    a caliper housing with a housing groove and a mounting recess;
    a first friction pad fixed to the housing groove of said caliper housing;
    a second friction pad adapted to move toward the first friction pad;
    a brake disk disposed between the first friction pad and the second friction pad;
    a pressurizing member operably connected to the second friction pad and formed with screw threads in an interior circumference of a rear end portion of said pressurizing member;
    a push rod having a threaded front end portion engaging with the screw threads of said pressurizing member and formed with a push rod groove being concave toward a front end of said push rod and at an inner circumference of a rear end portion of said push rod;
    an operating disk inserted in the push rod groove and adapted to selectively rotate the push rod to selectively move the pressurizing member forward with respect to the push rod;
    a non-rotating ramp adapted to exert force on the push rod so as to move the push rod forward;
    a first spring adapted to apply force against the force of the non-rotating ramp to the push rod;
    a rotating ramp mounted in the mounting recess of said caliper housing; and
    a ball disposed between the rotating ramp and the non-rotating ramp.

2. The electromotive brake system of claim 1, wherein the rotating ramp is adapted to convert a rotational movement of a motor to a linear movement of said non-rotating ramp by means of said ball.

3. The electromotive brake system of claim 2, wherein the operating disk is provided with a first catching portion and the rotating ramp is provided with a second catching portion selectively caught by the first catching portion such that the rotating ramp rotates the operating disk when the motor rotates to one direction and the rotating ramp does not rotate the operating disk when the motor rotates to the other direction.

4. The electromotive brake system of claim 3, wherein a plurality of teeth is formed at the push rod groove and a protrusion caught by the plurality of teeth is formed at a front surface of the operating disk, or a plurality of teeth is formed at the front surface of the operating disk and a protrusion caught by the plurality of teeth is formed at the push rod groove.

5. The electromotive brake system of claim 4, wherein an insert groove is formed at a front end of the rotating ramp and a rear end portion of the operating disk is inserted into the insert groove.

6. The electromotive brake system of claim 5, wherein a second spring is interposed between the operating disk and the rotating ramp to apply elastic force that may push the protrusion toward the plurality of teeth.

7. The electromotive brake system of claim 4, wherein a first slanted surface is formed at the plurality of teeth and a second slanted surface corresponding to the first slanted surface is formed at the protrusion such that the protrusion may climb the teeth when the motor rotates to the one direction and the protrusion may not climb the teeth when the motor rotates to the other direction.

8. The electromotive brake system of claim 7, wherein the operating disk rotates the push rod by the elastic force of the second spring when the motor rotates to the other direction after the protrusion climbs the teeth.

9. The electromotive brake system of claim 2, wherein the push rod groove is provided with a first catching portion and the operating disk is provided with a second catching portion selectively caught by the first catching portion such that the operating disk may not rotate the push rod when the operating disk rotates to one direction and the operating disk may rotate the push rod when the operating disk rotates to the other direction.

10. The electromotive brake system of claim 9, wherein a plurality of teeth is formed at a rear surface of the operating disk and a protrusion caught by the plurality of teeth is formed at a front surface of the rotating ramp, or a plurality of teeth is formed at the front surface of the rotating ramp and a protrusion caught by the plurality of teeth is formed at the rear surface of the operating disk.

11. The electromotive brake system of claim 10, wherein an insert groove is formed at a front end of the push rod groove and a front end portion of the operating disk is inserted in the insert groove.

12. The electromotive brake system of claim 11, wherein a second spring is interposed between the push rod groove and the operating disk to apply elastic force that may push the teeth toward the protrusion.

13. The electromotive brake system of claim 10, wherein a first slanted surface is formed at the plurality of teeth and a second slanted surface corresponding to the first slanted surface is formed at the protrusion such that the protrusion may climb the teeth when the motor rotates to one direction and the protrusion may not climb the teeth when the motor rotates to the other direction.

14. The electromotive brake system of claim 13, wherein the first and second catching portions are caught and the operating disk rotates the push rod when the motor rotates to the other direction after the protrusion climbs the teeth.

\* \* \* \* \*